(12) United States Patent
Lim

(10) Patent No.: US 7,450,632 B2
(45) Date of Patent: Nov. 11, 2008

(54) APPARATUS AND METHOD FOR PERFORMING A DEMODULATION OPERATION BASED ON TRANSMIT DIVERSITY IN A MOBILE COMMUNICATION SYSTEM

(75) Inventor: Young-Seok Lim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 665 days.

(21) Appl. No.: 10/806,373

(22) Filed: Mar. 23, 2004

(65) Prior Publication Data

US 2004/0190599 A1    Sep. 30, 2004

(30) Foreign Application Priority Data

Mar. 26, 2003   (KR) ...................... 10-2003-0018873

(51) Int. Cl.
   *H04B 1/69*    (2006.01)
(52) U.S. Cl. .................................................... 375/148
(58) Field of Classification Search ................. 375/144, 375/316, 148, 130, 140, 147, 267, 347, 141, 375/132; 370/337, 335, 342, 445; 455/101, 455/130, 132, 133, 137–139
   See application file for complete search history.

(56) References Cited

U.S. PATENT DOCUMENTS

| | | | |
|---|---|---|---|
| 6,865,397 B2* | 3/2005 | Park et al. ................... | 455/522 |
| 6,977,910 B1* | 12/2005 | Hosur et al. ................. | 370/318 |
| 6,996,380 B2* | 2/2006 | Dent .......................... | 455/101 |
| 7,010,055 B2* | 3/2006 | Harrison et al. ............. | 375/267 |
| 7,106,784 B2* | 9/2006 | Eltawil et al. ............... | 375/148 |
| 7,136,627 B2* | 11/2006 | Hamalainen et al. ........ | 455/101 |
| 2006/0183438 A1* | 8/2006 | Ishii et al. .................... | 455/101 |

* cited by examiner

*Primary Examiner*—Tesfaldet Bocure
(74) *Attorney, Agent, or Firm*—Roylance, Abrams, Berdo & Goodman, LLP

(57) ABSTRACT

An apparatus and method for demodulating signals transmitted from one or more Node-Bs using transmit diversity methods determined on a Node-B basis in a mobile communication system based on code division multiple access (CDMA). In the apparatus, a plurality of fingers assigned on a path-by-path basis discriminates among multipath signals received from the one or more Node-Bs. A combiner selectively combines signals output from the fingers according to the use of transmit diversity. A transmit diversity signal processor demodulates the signals combined by the combiner on the basis of one transmit diversity method determined by a transmit diversity controller. The transmit diversity controller determines the transmit diversity method through transmit diversity information received from the Node-Bs, and controls the transmit diversity signal processor according to the determined transmit diversity method.

19 Claims, 6 Drawing Sheets

APPARATUS AND METHOD FOR PERFORMING A DEMODULATION OPERATION BASED ON TRANSMIT DIVERSITY IN A MOBILE COMMUNICATION SYSTEM

This application claims priority to an application entitled "APPARATUS AND METHOD FOR PERFORMING DEMODULATION OPERATION BASED ON TRANSMIT DIVERSITY IN MOBILE COMMUNICATION SYSTEM", filed in the Korean Intellectual Property Office on Mar. 26, 2003 and assigned Serial No. 2003-18873, the contents of which are incorporated herein by reference.

BACKGROUND OF THE INVENTION

1. Field of the Invention

The present invention relates to a mobile communication system, and more particularly to an apparatus and method for enabling a user equipment (UE) to receive and demodulate signals transmitted from a Node-B using a transmit diversity method.

2. Description of the Related Art

As mobile communication systems are rapidly developed and an amount of service data to be provided by the mobile communication systems are rapidly increased, a third generation mobile communication system has been developed to transmit a large amount of data at a high rate. In terms of the third generation mobile communication system, a wideband-code division multiple access (W-CDMA) system operates in an asynchronous mode between Node-Bs in Europe and a code division multiple access-2000 (CDMA-2000) system is standardized as a radio access standard in North America.

The mobile communication system typically configures one Node-B and a plurality of user equipments (UEs) so that the Node-B and the UEs can communicate with one another. However, when data is transmitted at a high rate in the mobile communication system, a received signal can be distorted by a fading phenomenon on a radio channel. Where the received signal distorted by the fading phenomenon is not compensated for at the time of demodulating data of the received signal since the fading phenomenon can reduce the amplitude of the received signal by from several decibels (dB) to several tens of decibels (dB), transmission data of a transmitter can be erroneous and hence the quality of mobile communication service can be degraded. Thus, the fading phenomenon must be overcome so that the mobile communication system can transmit data at a high rate without degrading quality of service (QoS). To overcome the fading phenomenon, various types of diversity schemes are used.

Conventionally, the CDMA system uses a Rake receiver for performing diversity reception using the delay spread of a channel signal. The Rake receiver receives multipath signals in a reception diversity manner. One signal path is assigned to each finger of the Rake receiver so that the Rake receiver can perform a demodulation operation. However, there is a drawback in that the Rake receiver based on diversity technology using the above-described delay spread does not operate where a value of the delay spread is smaller than a set value. Furthermore, a time-diversity scheme using interleaving and coding technologies is typically used in a Doppler spread channel. However, there is a drawback in that it is difficult for the time-diversity scheme to be used in a low-speed Doppler spread channel.

To overcome the fading phenomenon, a space-diversity scheme is used in a channel with low delay spread such as an indoor channel and a channel with low-speed Doppler spread such as a pedestrian channel. The space-diversity scheme uses two or more transmitting and receiving antennas. In other words, where a level of a signal transmitted through one antenna is reduced because of the fading phenomenon, the space-diversity scheme allows a demodulation operation to be performed for signals transmitted through the remaining antenna or antennas.

The space-diversity scheme includes a receive antenna diversity method using receive diversity antennas and a transmit diversity method using transmit diversity antennas. When the receive antenna diversity method is applied to a UE, a plurality of antennas must be installed in the UE and hence the cost and size of the UE increases. Thus, it is recommended that the transmit diversity method be used in a Node-B in which a plurality of antennas are installed.

According to the transmit diversity method, a transmitter transmits signals using multiple antennas, and a receiver receives, demodulates and combines respective antenna signals, such that a fading channel can be compensated for. Typically, the above-described W-CDMA system uses two antennas provided in the Node-B to implement the transmit diversity method.

The transmit diversity method indicates an algorithm for receiving downlink signals and acquiring a diversity gain. The transmit diversity method includes an open-loop transmit diversity method and a closed-loop transmit diversity method. Furthermore, the open-loop transmit diversity method includes a time-switched transmit diversity (TSTD) scheme and a space-time transmit diversity (STTD) scheme. The closed-loop transmit diversity method includes a transmit antenna array (TxAA) scheme When a Node-B encodes information bits and transmits the encoded information bits through diversity antennas according to the open-loop transmit diversity method, a UE receives and decodes signals from the Node-B, such that a diversity gain can be acquired.

According to the closed-loop transmit diversity method, (1) the UE predicts channel environments that signals transmitted through transmitting antennas provided in the Node-B undergo, and calculates prediction values, (2) the UE calculates weights of the Node-B's antennas in which the maximum electric power for received signals can be generated using the calculated prediction values and transmits the calculated weights to the Node-B through an uplink, and (3) the Node-B receives weight signals from the UE and adjusts weights of the antennas. Here, the Node-B transmits pilot signals discriminated on an antenna-by-antenna basis to measure a channel of the UE, and the UE measures the channel through the pilot signals discriminated on the antenna-by-antenna basis and searches for an optimum weight as measured channel information.

The closed-loop transmit diversity method and the open-loop transmit diversity method will now be described in detail with reference to FIGS. 1 and 2.

FIG. 1 is a block diagram illustrating a transmitter using the TxAA scheme for implementing the closed-loop transmit diversity method.

A dedicated physical control channel (DPCCH) configured by a plurality of control signals and a dedicated physical data channel (DPDCH) configured by data signals are multiplexed to form a dedicated physical channel (DPCH). The DPCCH and DPDCH are typically multiplexed in a downlink using a time multiplexing operation.

A DPCH signal is scrambled with a scrambling code by a multiplier 104. On the other hand, the scrambled DPCH signal is multiplied by predetermined weights $W_1$ and $W_2$ by multipliers 106 and 108 so that the scrambled DPCH signal is applied to the closed-loop transmit diversity method. Output signals of the multipliers 106 and 108 are transmitted through the first antenna 114 and the second antenna 116, respectively.

Closed-loop transmit diversity methods are classified into schemes according to weight application types. In other words, the closed-loop transmit diversity methods include a closed-loop transmit diversity mode 1 scheme for deciding weights by taking into account a phase difference between signals received from the two antennas, and a closed-loop transmit diversity mode 2 for determining weights by taking into account a level difference between the signals received from the two antennas along with the phase difference.

The signals are multiplexed with specific pilots signals Common Pilot Channel 1(CPICH1) and Common Pilot Channel 2 (CPICH2) set on the antenna-by-antenna basis by multiplexers 110 and 112 so that a receiver can distinguish between the signals transmitted from the first and second antennas.

The UE's receiver receives the signals transmitted through the antennas, and the UE measures channel states for the antennas through the pilot signals and determines weights for the antennas so that reception signal power corresponding to a sum of the two antenna signals can be maximized. Weight information is defined as a set of several preset weights. The receiver selects one weight from the set of several preset weights so that reception electric power can be maximized. If information of the selected weight is transmitted through a feedback information (FBI) field contained in an uplink DPCCH message, an FBI message determinator 118 of the transmitter analyzes the FBI field received from the receiver, and a weight generator 120 generates the weights $W_1$ and $W_2$ on the antenna-by-antenna basis so that the weights $W_1$ and $W_2$ can be multiplied by the DPCH to be transmitted, respectively.

A channel encoding operation based on the STTD scheme of the open-loop transmit diversity method will now be described with reference to FIG. 2. FIG. 2 is a schematic diagram illustrating the channel encoding operation through an STTD encoder.

Symbols are sequentially input into the STTD encoder (not shown) according to transmit diversity encoding times used in the transmit diversity method. Then, the STTD encoder encodes the input symbols according to the STTD scheme, and transmits the encoded symbols to the two transmitting antennas. For example, when symbols $S_1$ and $S_2$ are sequentially input into the STTD encoder during transmit diversity encoding times $T_1$ and $T_2$, the STTD encoder encodes the sequentially input symbols $S_1$ and $S_2$, transmits a symbol signal $S_1S_2$ through the first antenna, and transmits a symbol signal $-S_2{}^*S_1{}^*$ through the second antenna.

Referring to FIG. 2, it is assumed that the symbols $S_1$ and $S_2$ are sequentially input according to the transmit diversity encoding times are configured by channel information bits 202 indicating $b_0b_1$ and $b_2b_3$. The channel information bits 202 indicating $b_0b_1$ and $b_2b_3$ corresponding to the symbols $S_1$ and $S_2$ are input into the STTD encoder. The STTD encoder encodes the channel information bits 202 indicating $b_0b_1b_2b_3$, outputs channel information bits 204 indicating $b_0b_1b_2b_3$ ($S_1S_2$) to the first antenna, and outputs channel information bits 206 indicating $-b_2b_3b_0-b_1$, ($-S_2{}^*S_1{}^*$) to the second antenna.

On the other hand, a channel structure of the W-CDMA system includes a physical channel, a transport channel and a logical channel. The physical channel has a structure of downlink and uplink physical channels according to information and data transmission directions. Furthermore, the downlink physical channels are classified into a physical downlink shared channel (PDSCH) and a downlink dedicated physical channel (DPCH).

When a signal is sent through the DPCH, the above-described STTD scheme is used as the open-loop transmit diversity method (according to a universal mobile telecommunications system (UMTS) standard TS 25.211). Channels using the STTD scheme include a primary-common control physical channel (P-CCPCH), a secondary-common control physical channel (S-CCPCH), a synchronization channel (SCH), a page indication channel (PICH), an acquisition indication channel (AICH), a PDSCH, etc.

Transmit diversity methods used in the physical channels are shown in the following Table 1.

TABLE 1

| Physical channel type | Open-loop transmit diversity | | Closed-loop transmit diversity |
|---|---|---|---|
| | TSTD | STTD | |
| P-CCPCH | X | O | X |
| SCH | O | X | X |
| S-CCPCH | X | O | X |
| DPCH | X | O | O |
| PICH | X | O | X |
| PDSCH | X | O | O |
| AICH | X | O | X |
| CSICH | X | O | X |
| AP-AICH | X | O | X |
| CD/CA-ICH | X | O | X |
| DL-DPCCH for CPCH | X | O | O |

At this time, requirements in applying the transmit diversity method to the physical channels are as follows.

1) The STTD scheme and the closed-loop transmit diversity method cannot be simultaneously applied to the same physical channel.

2) Where the transmit diversity method is applied to any downlink, it must be always applied to the P-CCPCH and SCH.

3) The PDSCH and the DPCH corresponding to the PDSCH must use the same transmit diversity method.

Conventionally, the CDMA mobile communication system uses the above-described Rake receiver. Where the downlink DPCHs are received from two or more Node-Bs in soft handover, a finger is assigned to one of multiple paths. That is, multipath signals from the Node-Bs are assigned to fingers of the Rake receiver, and the fingers receive the multipath signals.

The above-described method enables a transmit diversity signal processor provided in each finger stage to process each multipath signal according to a transmit diversity method for each Node-B.

FIG. 3 is a block diagram illustrating the Rake receiver equipped with transmit diversity processors coupled to fingers. As described above, the receiver of the UE includes a plurality of fingers so that signals on a path-by-path basis are demodulated to compensate for multipath fading. Furthermore, where the transmitter uses space diversity through two antennas, the receiver demodulates two types of signals received from the two antennas on a finger-by-finger basis. In other words, demodulation signals associated with the first and second antennas 302 and 304 are generated from the first finger and demodulation signals associated with the first and second antennas 306 and 308 are generated from the second finger.

A W-CDMA-based UMTS combines DPCHs transmitted from a plurality of Node-Bs in soft handover. At this time, the use of a transmit diversity method between the Node-Bs transmitting the DPCHs capable of being simultaneously received by the receiving side must obey the following rules according to a standard.

1) Upon transmitting the DPCHs to a desired UE, the Node-Bs use one transmit diversity method. In other words, the Node-Bs cannot simultaneously use the open-loop transmit diversity method and the closed-loop transmit diversity method.

2) When all Node-Bs currently performing a transmission operation use no transmit diversity method, the use of a transmit diversity method in a Node-B desiring to transmit a new DPCH is not affected by other Node-Bs.

3) When at least one of the Node-Bs currently performing a transmission operation transmits a DPCH using the open-loop transmit diversity method, a new Node-B can transmit a DPCH using the open-loop transmit diversity method or without using the open-loop transmit diversity method.

4) When at least one of the Node-Bs currently performing a transmission operation transmits a DPCH using the closed-loop transmit diversity mode 1, a new Node-B can transmit a DPCH using the closed-loop transmit diversity mode 1 or without using the closed-loop transmit diversity mode 1.

5) When at least one of the Node-Bs currently performing a transmission operation transmits a DPCH using the closed-loop transmit diversity mode 2, a new Node-B can transmit a DPCH using the closed-loop transmit diversity mode 2 or without using the closed-loop transmit diversity mode 2.

In other words, where the downlink DPCHs are received from two or more Node-Bs in soft handover, a transmit diversity method to be used by each Node-B is not affected by that used by other Node-Bs. On the other hand, when the transmit diversity method is used, the open-loop transmit diversity method and the closed-loop transmit diversity method cannot be simultaneously used. When the closed-loop transmit diversity method is used, the closed-loop transmit diversity modes 1 and 2 cannot be simultaneously used. Consequently, only one of the transmit diversity methods must be selected and used.

In one method for satisfying the above-described standard, a receiver for processing the diversity can assign one or more fingers for a plurality of Node-Bs. For example, when four fingers are provided in the receiver, two fingers can be assigned to receive signals from the first Node-B, and other two fingers can be assigned to receiver signals from the second Node-B. In other words, as a plurality of fingers are assigned in relation to one Node-B, a demodulation operation can be performed using diversity according to multiple paths. Furthermore, since the demodulation operation can be performed on a finger-by-finger basis and on a transmitting antenna-by-antenna basis, the demodulation operation can be performed on the basis of transmit diversity.

Referring to FIG. 3, the demodulation operation must be performed by taking into account a transmit diversity method of each Node-B when it is assumed that a plurality of fingers are assigned for a plurality of Node-Bs. For example, where the first and second fingers are assigned for the demodulation operation associated with the first Node-B and the first Node-B uses a space-time transmit diversity (STTD) scheme for open-loop transmit diversity as the transmit diversity method, signals discriminated by the first and second fingers must be demodulated by the first and second transmit diversity signal processors 322 and 324 provided in the transmit diversity signal processor 320 on the basis of the STTD scheme.

Furthermore, where the third and fourth fingers are assigned for the demodulation operation associated with the second Node-B and the second Node-B performs a transmission operation without using transmit diversity, signals detected by the third and fourth fingers are sent to a combiner 330 without being applied to the transmit diversity signal processing operations of the third and fourth transmit diversity signal processors (not shown) provided in the transmit diversity signal processor 320.

The transmit diversity signal processors 322 to 326 perform transmit diversity signal processing operations for multipath signals obtained from the fingers assigned on a Node-B basis, signals corresponding to a result of the transmit diversity signal processing operations are combined by the combiner 330, and the combined signals are finally output.

Transmit diversity signals can be independently processed as shown in FIG. 3. However, there is a problem in that the complexity of hardware increases as the number of fingers increases. Furthermore, since demodulation operations based on all transmit diversity methods must be able to be performed through the fingers according to various types of transmit diversity methods, a structure of the receiver becomes complex.

Thus, there is another problem in that a structure for performing a transmit diversity signal processing operation in the Rake receiver equipped with the large number of fingers is inefficient.

SUMMARY OF THE INVENTION

Therefore, the present invention has been made in view of the above problems, and it is one object of the present invention to provide an apparatus and method for efficiently demodulating transmit diversity signals received from a plurality of Node-Bs in a mobile communication system.

It is another object of the present invention to provide an apparatus for demodulating signals transmitted from a plurality of Node-Bs through various transmit diversity methods, which can effectively minimize the complexity of hardware.

It is yet another object of the present invention to provide a demodulation apparatus capable of eliminating a performance degradation phenomenon when signals received from a plurality of Node-Bs through various transmit diversity methods are mixed.

In accordance with one aspect of the present invention, the above and other objects can be substantially accomplished by the provision of an apparatus for demodulating signals transmitted from one or more Node-Bs using transmit diversity methods selected on a Node-B basis in a mobile communication system based on code division multiple access (CDMA), comprising: a plurality of fingers assigned on a path-by-path basis for distinguishing among multipath signals received from the one or more Node-Bs; a combiner for selectively combining signals output from the fingers according to the use of transmit diversity; a transmit diversity signal processor for demodulating the signals combined by the combiner on the basis of one transmit diversity method selected by a transmit diversity controller; and the transmit diversity controller for deciding the transmit diversity method through transmit diversity information received from the Node-Bs, and controlling the transmit diversity signal processor according to the selected transmit diversity method.

In accordance with another aspect of the present invention, the above and other objects can be substantially accomplished by the provision of a method for demodulating signals transmitted from one or more Node-Bs using transmit diversity methods selected on a Node-B basis in a mobile communication system based on code division multiple access (CDMA), comprising the steps of: receiving transmit diversity information of the Node-Bs and selecting one transmit diversity method on the basis of the received transmit diversity information; assigning multipath signals received from the one or more Node-Bs to a plurality of fingers on a path-by-path basis and distinguishing among the multipath signals; selectively combining signals output from the fingers according to the use of transmit diversity; and demodulating the signals combined by the combiner on the basis of the selected transmit diversity method.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Several embodiments of the present invention will be described in detail with reference to the accompanying drawings. In the following description, a detailed description of known functions and configurations incorporated herein will be omitted for conciseness.

Figure 4:
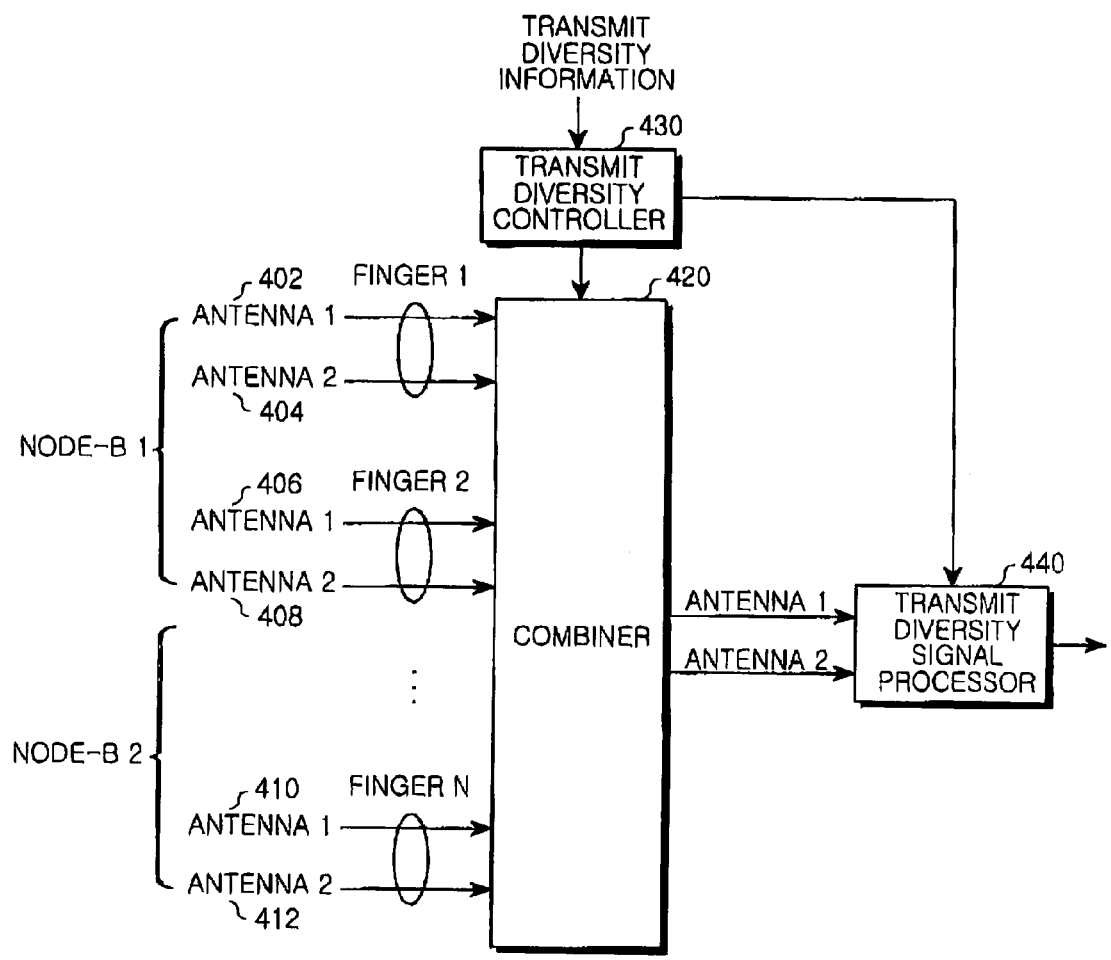
FIG. 4 is a block diagram illustrating an apparatus for demodulating signals based on a plurality of diversity methods received from Node-Bs in accordance with one embodiment of the present invention.

FIG. 4 is a block diagram illustrating an apparatus for demodulating signals based on a plurality of diversity methods received from Node-Bs in accordance with one embodiment of the present invention.

Referring to FIG. 4, signals transmitted from fingers assigned on a Node-B basis are combined by a combiner 420 before a transmit diversity signal processing operation is performed. Furthermore, a transmit diversity controller 430 selects one demodulation method based on transmit diversity. The transmit diversity signal processing operation based on the selected transmit diversity demodulation method is performed for the combined signals by a transmit diversity signal processor 440.

Since the demodulation apparatus shown in FIG. 4 has linearity between processing operations of elements provided in the demodulation apparatus, the demodulation apparatus can be implemented with a simplified structure in comparison with the above-described conventional demodulation apparatus. Furthermore, the demodulation operation can be appropriately performed by the single transmit diversity signal processor 440 since two different transmit diversity methods cannot be simultaneously used when a plurality of transmit diversity signals are demodulated.

Before the structure of the demodulation apparatus in accordance with the embodiment of the present invention is described, the linearity of the demodulation apparatus in accordance with the embodiment of the present invention and the demodulation method according to the use of a plurality of transmit diversity methods will now be described.

First, rules in processing the transmit diversity signals will be described.

When a predetermined mobile communication terminal uses a plurality of transmit diversity methods associated with different radio links within the same active set that indicates a set of all cells with the radio links for allowing the mobile communication terminal to transmit and receive data, the following rules must be obeyed.

1) One transmit diversity method must be used within one active set. Open-loop and closed-loop transmit diversity methods cannot be simultaneously used between different radio links within the one active set.

2) Where no transmit diversity method is used in one or more radio links, the radio link without using the transmit diversity method does not affect a transmit diversity method for other radio links within the same active set.

3) Where a space-time transmit diversity (STTD) scheme is used in one or more radio links within the active set, the terminal must use the STTD scheme in radio links using STTD or all radio links within the active set.

4) Where the closed-loop transmit diversity method is used in one or more radio links within the active set, the terminal must use the closed-loop transmit diversity method in radio links using closed-loop transmit diversity or all radio links within the active set.

In other words, downlink dedicated physical channels (DPCHs) are received from two or more Node-Bs in soft handover, a transmit diversity method to be used by each Node-B is not affected by that used by other Node-Bs. On the other hand, when the transmit diversity method is used, the open-loop transmit diversity method and the closed-loop transmit diversity method cannot be simultaneously used. When the closed-loop transmit diversity method is used, the closed-loop transmit diversity modes 1 and 2 cannot be simultaneously used. Consequently, only one of the transmit diversity methods must be selected and used.

Even though the order of operations of the combiners 420 and the transmit diversity signal processor 440 shown in FIG. 4 is changed, the single transmit diversity signal processor 440 can demodulate signals based on a plurality of transmit diversity methods received from a plurality of Node-Bs.

Figure 1:
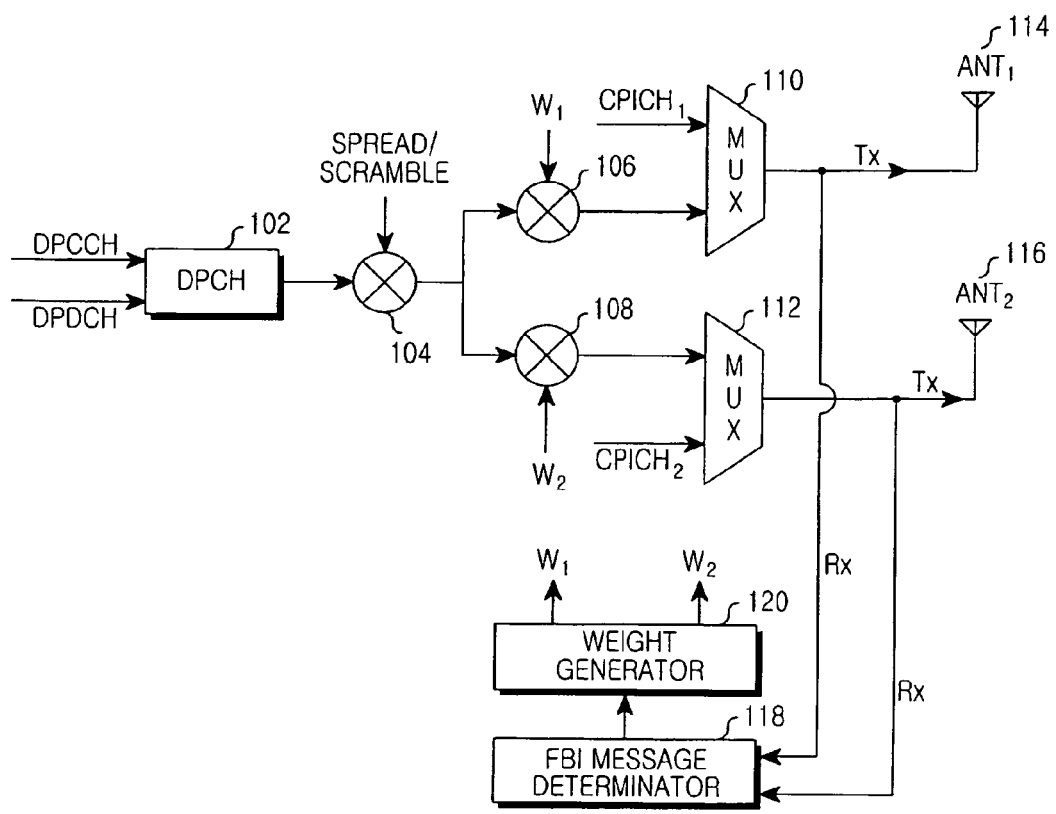
FIG. 1 is a block diagram illustrating the structure of a conventional transmitter using closed-loop transmit diversity.

The linearity of the above-described closed-loop transmit diversity method associated with FIG. 1 will now be described.

Assuming that a predetermined Node-B transmits signals through two transmitting antennas and a desired signal d to be transmitted is transmitted through multiple paths, signals received by a predetermined $i^{th}$ finger provided in the demodulation apparatus of a receiver can be expressed as the following Equation 1.

$$y_i = h_{1,i} w_i d + h_{2,i} w_2 d \qquad \text{Equation 1}$$

In the above Equation 1, $h_{1,i}$ and $h_{2,i}$ denote a channel path property coefficient of the first antenna and a channel path property coefficient of the second antenna associated with an $i_{th}$ multipath signal, respectively. Furthermore, $w_1$ and $w_2$ denote weights used in a transmitter to apply the closed-loop transmit diversity method.

Where the closed-loop transmit diversity method is used, a signal modulation operation is performed using a compensation operation for channel paths through the antennas, a compensation operation for weight signals used in the transmitter and an addition operation in relation to multipath signals. After signals associated with the closed-loop transmit diversity method are demodulated, a signal r corresponding to a result of the combining operation is expressed as the following Equation 2.

$$r = \sum_{i=1}^{N} (h_{1,i}w_1 + h_{2,i}w_2)^* y_i \qquad \text{Equation 2}$$
$$= \sum_{i=1}^{N} |h_{1,i}w_1 + h_{2,i}w_2|^2 d$$

Figure 2:
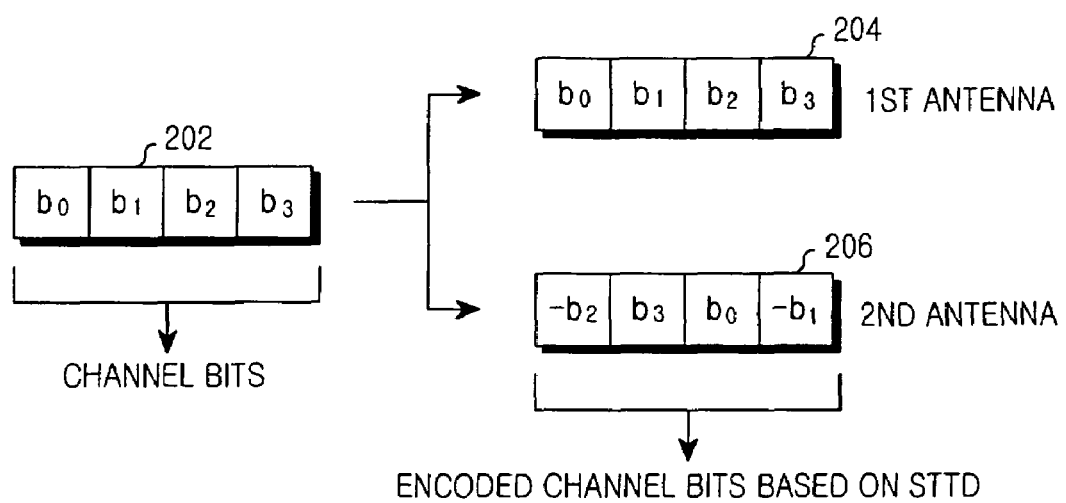
FIG. 2 is a block diagram illustrating the concept of a conventional space-time transmit diversity (STTD) scheme of open-loop transmit diversity.

On the other hand, the STTD scheme of the open-loop transmit diversity method described above in relation to FIG. 2 performs an encoding operation for two adjacent signals of signals to be transmitted by the transmitter in a time-space domain, and then transmits a result of the encoding operation to the antennas. When the signals to be transmitted are expressed as $S_1=b_0+jb_1$ and $S_2=b_2+jb_3$ corresponding to quadrature phase-shift keying (QPSK) signals, a signal of $[S_1, S_2]$ is transmitted through the first antenna and the second antenna transmits a signal of $[-S_2^*, S_1^*]$ corresponding to the result of the encoding operation for the signal of the first antenna. When a signal received by the receiver at a specific time i is denoted by $y_i$, $y_i$ is expressed as the following Equation 3.

$$y_i = \sum_{j=1}^{N} y_{i,j} \qquad \text{Equation 3}$$

$y_{i,j} = h_{1,j}S_1 - h_{2,j}S_2^* + n_{i,j}$ ($i \in$ even number)

$y_{i,j} = h_{1,j}S_2 + h_{2,j}S_1^* + n_{i,j}$ ($i \in$ odd number)

In the above Equation 3, N denotes the total number of multiple paths, and $y_{i,j}$ denotes a $j^{th}$ multipath signal received at an $i^{th}$ time. Furthermore, $n_{i,j}$ denotes noise contained in a transmitted signal.

On the other hand, when two adjacent symbol times are 2i and 2i+1 in a $j^{th}$ finger, a decoding operation for received two signals is carried out and original signals as a result of the decoding operation are given by the following Equations 4 and 5.

$$S_{1,j} = y_{2i,j}h_{1,j}^* + y_{2i+1}^*h_{2,j} \qquad \text{Equation 4}$$
$$= (|h_{1,j}|^2 + |h_{2,j}|^2)S_1 + h_{1,j}^* n_{2i,j} + h_{2,j} n_{2i+1,j}^*$$

$$S_{2,j} = -y_{2i,j}^* h_{2,j} + y_{2i+1,j} h_{1,j}^* \qquad \text{Equation 5}$$
$$= (|h_{1,j}|^2 + |h_{2,j}|^2)S_2 - h_{2,j} n_{2i,j}^* + h_{1,j}^* n_{2i+1,j}$$

Referring to the above Equations 1 to 5, it can be seen that a transmit diversity signal processing method based on the open-loop and closed-loop transmit diversity methods has linearity. In other words, since the above Equations are configured by addition and multiplication operations, the above Equations have the linearity. Thus, the transmit diversity signal processing method has linearity.

Figure 3:
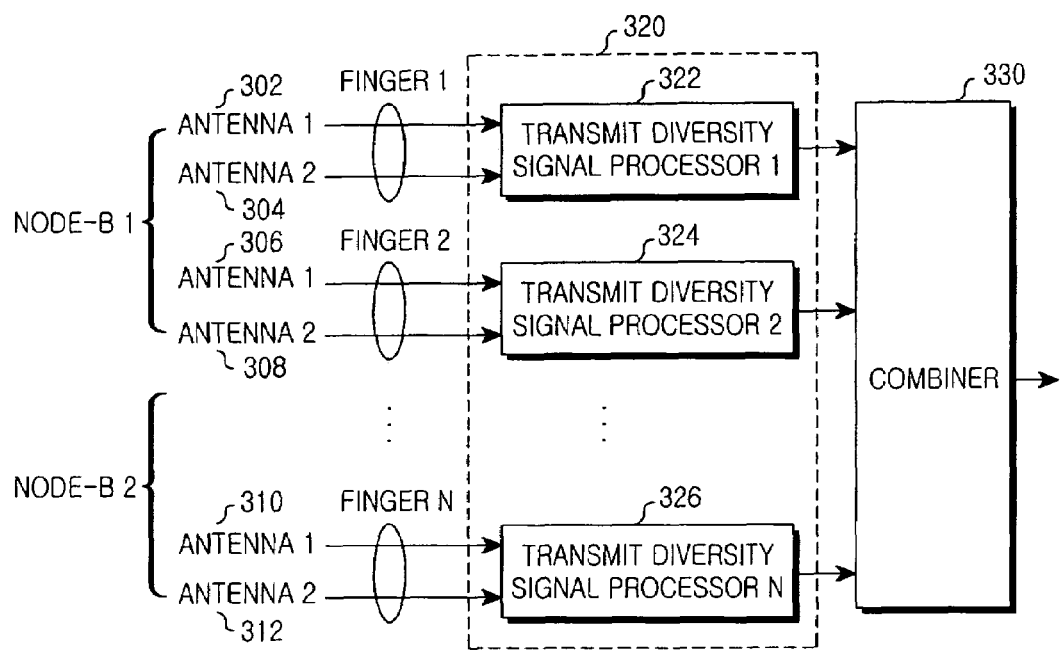
FIG. 3 is a block diagram illustrating an apparatus for demodulating signals based on a plurality of diversity methods received from Node-Bs.

The conventional Rake receiver shown in FIG. 3 includes the finger stage for receiving multipath signals and demodulating the received multipath signals and the combiner for combining the demodulated multipath signals.

The single transmit diversity signal processor is located in a combining stage rather than a finger stage according to the linearity of the transmit diversity signal processing method and the transmit diversity application rules so that the simplified structure of hardware can be implemented and the single transmit diversity signal processor can demodulate signals based on various transmit diversity methods transmitted by a plurality of Node-Bs in accordance with the present invention.

The demodulation apparatus of the present invention will be described in detail with reference to FIG. 4.

As described above, the demodulation apparatus of the receiver includes a plurality of fingers so that multipath signals can be demodulated, and can assign one or more fingers on a Node-B basis. For example, the first and second fingers are assigned to the first Node-B, and the third and fourth fingers are assigned to the second Node-B. Two types of reception path signals transmitted from the first Node-B can be demodulated, and two types of reception path signals from the second Node-B can be demodulated.

When each of the Node-Bs uses the transmit diversity method for transmitting the signals through the two antennas, individual demodulation operations for antenna diversity must be performed by taking into account the two antennas per finger. In other words, a demodulation operation for signals from the first and second antennas 402 and 404 is performed by the first finger, a demodulation operation for signals from the first and second antennas 406 and 408 is performed by the second finger, and a demodulation operation for signals from the first and second antennas 410 and 412 is performed by the $N^{th}$ finger.

On the other hand, even though the Node-B performs a signal transmission operation without making use of a transmit diversity method, the receiver can perform a signal demodulation operation by performing a decoding operation based on a predetermined transmit diversity signal processing operation. This can be confirmed by the above Equations 3 to 5 where the second antenna signals are set to "0". In this case, only a noise component is added through the second antennas. Thus, this case can cause lower performance in comparison with the case where the signal demodulation operation is performed without making use of the transmit diversity method.

A control operation is performed so that only second antenna signals can be combined in relation to fingers assigned for the Node-B without making use of transmit diversity.

Referring to FIG. 4, the transmit diversity controller 430 can control the combiner 420 to determine whether the second antenna signals associated with the fingers must be combined. For example, where the first and second fingers are assigned for the first Node-B using the transmit diversity, and the third and fourth fingers are assigned for the second Node-B without making use of the transmit diversity, it is preferable that the combiner 420 combines all signals of the first and second antennas from the first and second fingers according to the control of the transmit diversity controller 430, and combines only the signals of the first antennas from the third and fourth fingers.

The transmit diversity controller 430 receives transmit diversity information from the Node-Bs, and controls the combiner 420 and the transmit diversity signal processor 440 on the basis of the received information. The transmit diversity information on a Node-B basis is transmitted to all UEs within a predetermined cell through broadcast channels (BCHs) sent from the Node-Bs.

The transmit diversity controller 430 collects the transmit diversity information associated with all Node-Bs within an active set, and decides a transmit diversity demodulation method for the signals sent from the Node-Bs according to the above-described transmit diversity demodulation rules.

For example, assuming that a predetermined mobile communication terminal forms at least one dedicated channel with the first Node-B to transmit and receive data, the mobile communication terminal receives information of at least one peripheral Node-B in a handover area. When it is assumed that the first Node-B performs a transmission operation using open-loop transmit diversity, and the second Node-B being the peripheral Node-B performs a transmission operation using closed-loop transmit diversity, a demodulation operation based on the open-loop transmit diversity method is performed in relation to the first Node-B, and a demodulation operation is performed in relation to the second Node-B without making use of transmit diversity. It is preferable that only the signals of the first antennas from the fingers assigned for the second Node-B undergo the combining operation as described above.

A method for enabling the transmit diversity controller 430 to receive transmit diversity information from the Node-Bs using various transmit diversity methods and to decide a transmit diversity demodulation method will be described below with reference to FIG. 6.

In brief, signals received from a plurality of Node-Bs are assigned to a plurality of fingers, and each of the Node-Bs can use a plurality of transmit diversity methods. Signals from the fingers are selectively combined by the combiner 420 according to the used transmit diversity methods. The selection operation is determined by the transmit diversity controller 430. The combined signals undergo a transmit diversity signal processing operation by the transmit diversity signal processor 440 according to one transmit diversity demodulation decided by the transmit diversity controller 430.

This operation will be described with reference to a Rake receiver equipped with four fingers (associated with the case of N=4 in FIG. 4) as an example. It is assumed that a user equipment (UE) receives signals from two Node-Bs in handover. Further, it is assumed that the first Node-B transmits a dedicated physical channel (DPCH) without making use of the transmit diversity method, and the second Node-B transmits a DPCH using the transmit diversity method. Furthermore, it is assumed that the number of multiple paths associated with the first Node-B and the number of multiple paths associated with the second Node-B are "2", respectively, the first and second fingers are assigned to the multiple paths associated with the first Node-B, and the third and fourth fingers are assigned to the multiple paths associated with the second Node-B.

Since the first Node-B uses the transmit diversity method, the first and second fingers output signals of the first and second antennas. On the other hand, since the second Node-B does not use the transmit diversity method, the third and fourth fingers output signals of the first antennas. Here, the UE performs a compensation operation associated with a fading channel for the signals of the first and second antennas. Thus, the combiner 420 shown in FIG. 4 performs the following combining operation.

1) The signals of the first and second antennas associated with the first and second fingers join the combining operation.

2) Only the signals of the first antennas associated with the third and fourth fingers join the combining operation.

As described above, the transmit diversity signal processor 440 performs a transmit diversity signal processing operation for the combined signals on the basis of the transmit diversity method used in the first Node-B.

A method for combining the signals output from the fingers and a transmit diversity signal processing method to be performed by the transmit diversity signal processor 440 are decided by the transmit diversity controller 430 receiving the transmit diversity information from the Node-Bs.

Figure 5:
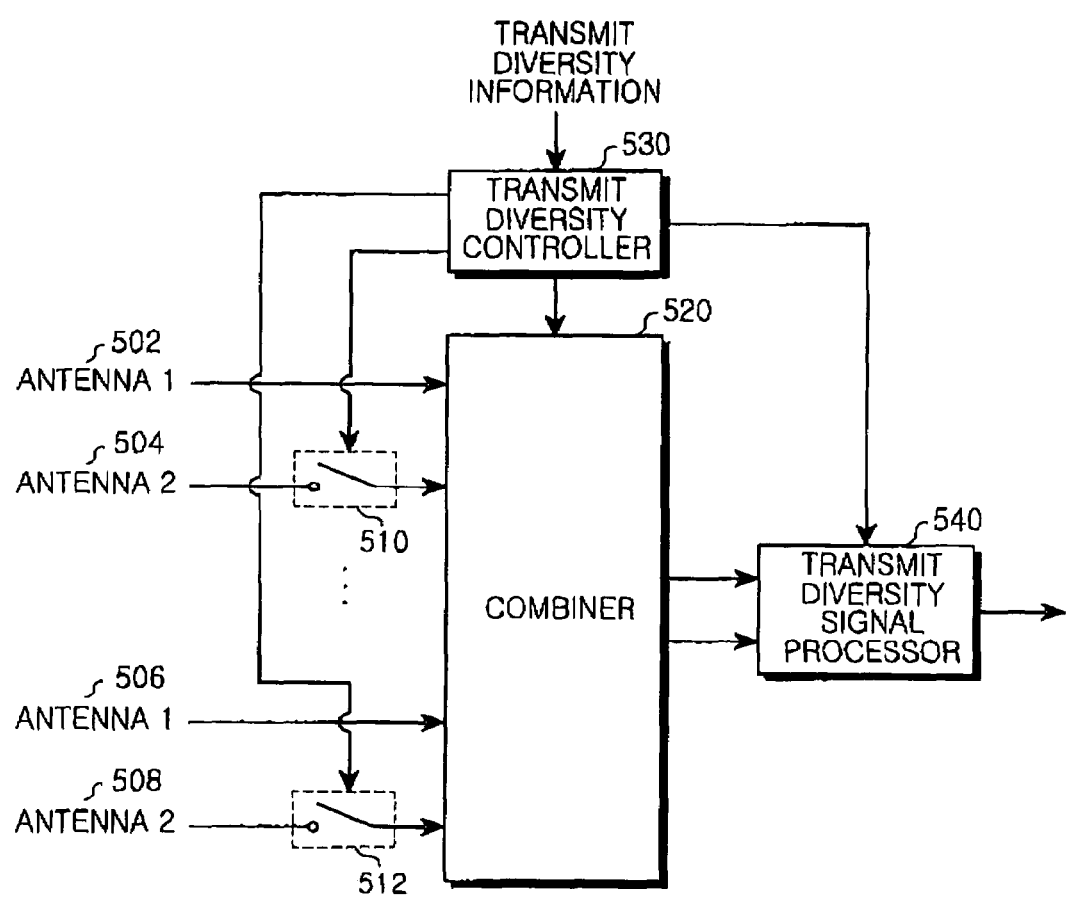
FIG. 5 is a block diagram illustrating an apparatus for demodulating signals based on a plurality of diversity methods received from Node-Bs in accordance with another embodiment of the present invention.

A method for enabling the combiner 420 to select the antenna signals on a finger-by-finger basis can be implemented as shown in FIG. 5. FIG. 5 is a block diagram illustrating an apparatus for demodulating signals based on a plurality of diversity methods received from Node-Bs in accordance with another embodiment of the present invention.

Referring to FIG. 5, a plurality of fingers assigned to each Node-B take into account channel environments associated with the first antennas 502 and 506 and the second antennas 504 and 508 so that a demodulation operation can be performed.

Signals of the first antennas 502 and 506 are combined by a combiner 520 irrespective of a transmit diversity method, and signals of the second antennas 504 and 508 are combined according to the transmit diversity method.

Where a predetermined Node-B does not use the transmit diversity method in terms of fingers assigned to the Node-B, the signals of the second antennas 504 and 508 do not join the combining operation of the combiner 520. The combining operation for the signals of the second antennas 504 and 508 is determined according to the use of the transmit diversity method. The signals of the second antennas 504 and 508 are selected by switches 510 and 512 coupled to the second antennas 504 and 508 according to the control of the transmit diversity controller 530 receiving the transmit diversity information.

For example, the switch 510 or 512 of the second antenna 504 or 508 associated with the fingers is turned on in relation to the Node-B using the transmit diversity method, and the switch 510 or 512 of the second antenna 504 or 508 associated with the fingers is turned off in relation to the Node-B without using the transmit diversity method.

On the other hand, all signals of the first and second antennas can be combined without making use of any switches, but performance degradation due to noise can be caused as described above.

The signals combined by the combiner 520 undergo the transmit diversity signal processing operation in the transmit diversity signal processor 540 as described above in relation to FIG. 4.

Figure 6:
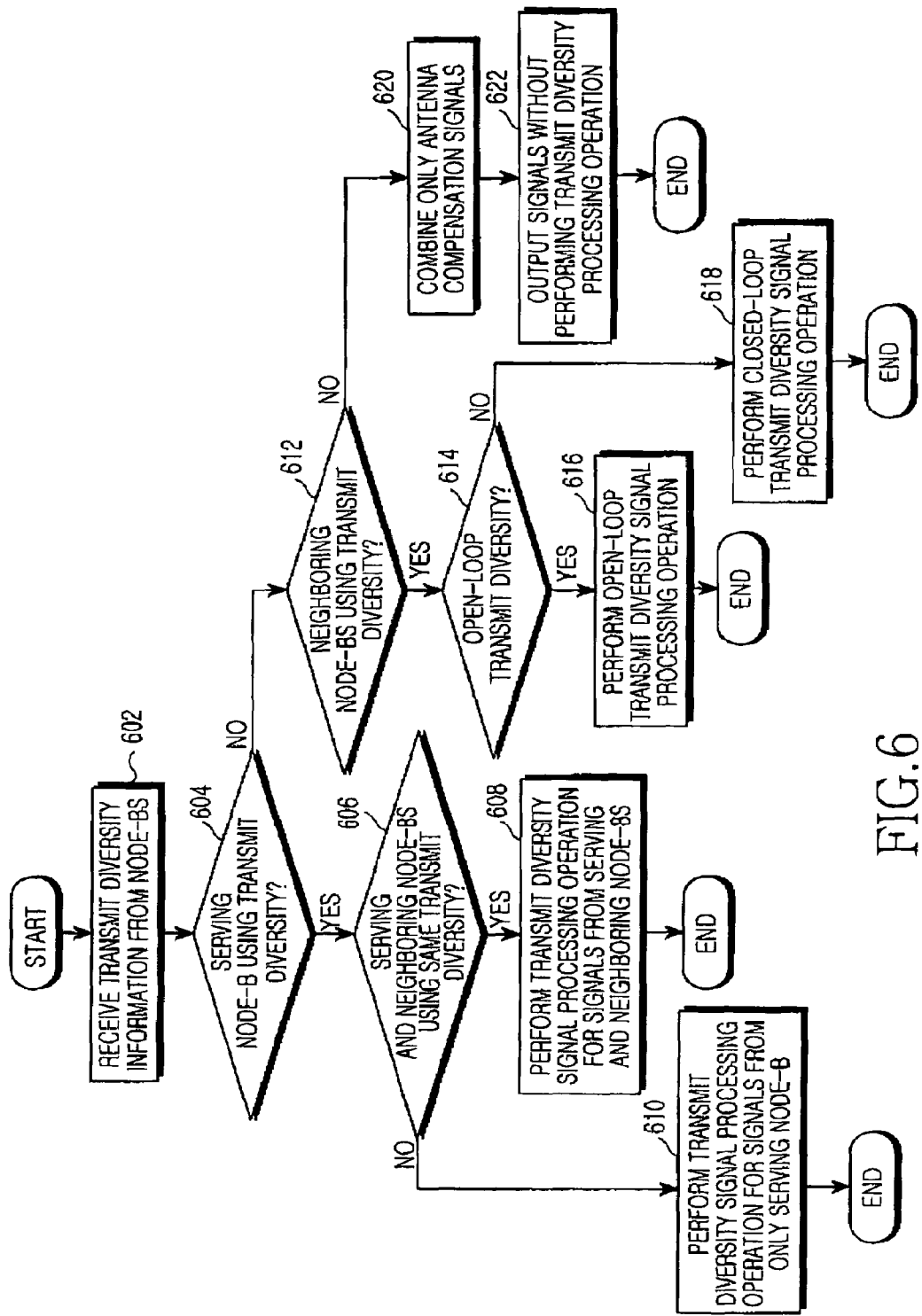
FIG. 6 is a flow chart illustrating a method for demodulating signals based on a plurality of diversity methods received from Node-Bs by means of a transmit diversity controller in accordance with an embodiment of the present invention.

FIG. 6 is a flow chart illustrating a method for demodulating signals based on a plurality of diversity methods received from Node-Bs by means of the transmit diversity controller in accordance with an embodiment of the present invention.

Referring to FIG. 6, the transmit diversity controller 430 or 530 shown in FIGS. 4 and 5 selects one transmit diversity processing method according to transmit diversity information received from the Node-Bs.

As described above, transmit diversity information items of the Node-Bs are transmitted through BCHs, and one transmit diversity method is selected from the transmit diversity information items of the Node-Bs according to the above-described rules.

In other words, when a serving Node-B currently transmitting and receiving data uses no transmit diversity method, a transmit diversity method used in neighboring Node-Bs can be considered. On the other hand, if the serving Node-B uses a transmit diversity method, a transmit diversity method to be applied to a neighboring Node-B must be selected after a determination is made as to whether the transmit diversity method to be applied to the neighboring Node-B is the same as the transmit diversity method of the serving Node-B.

This will now be described in detail with reference to FIG. 6. The transmit diversity controller 430 or 530 receives transmit diversity information from the Node-Bs through BCHs at step 602, and the use of transmit diversity can be confirmed from the transmit diversity information as in the following.

At this time, the transmit diversity controller 430 or 530 determines, at step 604, whether or not the serving Node-B uses transmit diversity. If the serving Node-B uses the transmit diversity, the transmit diversity controller 430 or 530 compares a transmit diversity method of the serving Node-B with transmit diversity methods of the neighboring Node-Bs at step 606.

If the serving Node-B and the neighboring Node-Bs use the same transmit diversity method as a result of the determination, a transmit diversity signal processing operation is carried out for signals received from the serving Node-B and the neighboring Node-Bs on the basis of the same transmit diversity method at step 608.

However, if the serving Node-B and the neighboring Node-Bs do not use the same transmit diversity method, demodulation operations in different transmit diversity methods cannot be performed according to the above-described rules. Thus, only a transmit diversity signal processing operation associated with the serving Node-B is performed, and transmit diversity signal processing operations associated with the neighboring Node-Bs are not performed at step 610. In other words, only signals received from the first antennas associated with the fingers assigned for the neighboring Node-Bs are combined and signals received from the second antennas are not combined.

For example, if the STTD of the open-loop transmit diversity method is applied to the serving Node-B, and the closed-loop transmit diversity method is applied to the neighboring Node-Bs, a demodulation operation for the signals received from the serving Node-B is performed on the basis of the STTD scheme of the open-loop transmit diversity method and a demodulation operation is performed irrespective of the closed-loop transmit diversity method. In other words, signals received from the first and second antennas associated with the fingers assigned for the serving Node-B are combined and only signals received from the first antennas associated with the fingers assigned for the neighboring Node-Bs are combined. Furthermore, a transmit diversity signal processing operation for the combined signals is performed by the transmit diversity signal processor 440 or 540 on the basis of the STTD scheme of the open-loop transmit diversity method.

On the other hand, when determining that the serving Node-B does not use transmit diversity as a result of the determination at the above step 604, the transmit diversity controller 430 or 530 determines, at step 612, whether the neighboring Node-Bs use transmit diversity.

If the neighboring Node-Bs use the transmit diversity, a transmit diversity method for the neighboring Node-Bs can be used. In other words, no transmit diversity for the serving Node-B is used and the transmit diversity for the neighboring Node-Bs can be used. At step 614, a determination is made as to whether the neighboring Node-Bs use the open-loop transmit diversity method. If the neighboring Node-Bs use the open-loop transmit diversity method, the transmit diversity signal processor 440 or 540 performs an open-loop transmit diversity processing operation at step 616. On the other hand, if the neighboring Node-Bs use the closed-loop transmit diversity method, the transmit diversity signal processor 440 or 540 performs a closed-loop transmit diversity processing operation at step 618.

Since it is determined that all Node-Bs use no transmit diversity if the neighboring Node-Bs use no transmit diversity, only antenna compensation signals are combined at step 620, and the combined signals are output without making use of a transmit diversity processing operation at step 622.

In other words, only signals received from the first antennas associated with the fingers assigned for the Node-Bs are combined, and the combined signals are output without making use of a transmit diversity processing operation.

It is obvious that the transmit diversity methods must be applied differently since the transmit diversity methods of the Node-Bs are various as described above. In other words, the STTD and TSTD schemes can be differently applied in the case of the same open-loop transmit diversity. The closed-loop transmit diversity method includes the closed-loop transmit diversity modes 1 and 2. In the case where different transmit diversity methods are used, the different transmit diversity methods cannot be simultaneously applied according to the above-described rules. For example, if the closed-loop transmit diversity mode 1 is applied to the serving Node-B and the closed-loop transmit diversity mode 2 is applied to the neighboring Node-Bs, a processing operation is carried out without applying the transmit diversity associated with the neighboring Node-Bs.

As apparent from the above description, the present invention enables a receiver provided in a mobile communication terminal to minimize the complexity of hardware and appropriately process transmit diversity signals while eliminating a performance degradation phenomenon where various transmit diversity signals and non transmit diversity signals are received together.

Although the embodiments of the present invention have been disclosed for illustrative purposes, those skilled in the art will appreciate that various modifications, additions and substitutions are possible, without departing from the scope of the invention. Therefore, the present invention is not limited to the above-described embodiments and drawings.

What is claimed is:

1. An apparatus for demodulating signals transmitted from one or more Node-Bs using transmit diversity methods selected on a Node-B basis in a mobile communication system based on code division multiple access (CDMA), comprising:

a plurality of fingers assigned on a path-by-path basis for discriminating among multipath signals received from the one or more Node-Bs;

a transmit diversity controller for determining a transmit diversity method through transmit diversity information received from the Node-Bs;

a combiner for selectively combining signals output from the fingers according to the determined transmit diversity method; and a transmit diversity signal processor for demodulating the signals combined by the combiner on the basis of one transmit diversity method selected by the transmit diversity controller.

2. The apparatus as set forth in claim 1, wherein the transmit diversity method comprises one of an open-loop transmit diversity method and a closed-loop transmit diversity method.

3. The apparatus as set forth in claim 2, wherein the open-loop transmit diversity method comprises one of a time-switched transmit diversity (TSTD) scheme and a space-time transmit diversity (STTD) scheme.

4. The apparatus as set forth in claim 2, wherein the closed-loop transmit diversity method comprises one of a first closed-loop transmit diversity mode for performing a compensation operation by taking into account a phase difference between signals received from antennas of each Node-B, and a second closed-loop transmit diversity mode for performing a compensation operation by taking into account the phase difference and a level difference between the signals received from the antennas of each Node-B.

5. The apparatus as set forth in claim 1, wherein the combiner selects and combines all signals output from fingers using transmit diversity and only first antenna components of signals output from other fingers without using the transmit diversity.

6. The apparatus as set forth in claim 1, further comprising:
switches arranged between second antenna component outputs and an input terminal of the combiner so that second antenna component signals can be selectively input into the combiner.

7. The apparatus as set forth in claim 6, wherein the switches are turned on/off by the transmit diversity controller.

8. The apparatus as set forth in claim 1, wherein the transmit diversity controller performs a control operation so that a transmit diversity method of at least one neighboring Node-B is applied to the transmit diversity signal processor where a serving Node-B performs a transmission operation without using transmit diversity.

9. The apparatus as set forth in claim 1, wherein the transmit diversity controller performs a control operation so that a demodulation operation for signals from at least one neighboring Node-B can be performed without using transmit diversity where a serving Node-B performs a transmission operation using predetermined transmit diversity and a transmit diversity method of the neighboring Node-B is different from that of the serving Node-B.

10. The apparatus as set forth in claim 1, wherein the transmit diversity controller performs a control operation so that the transmit diversity signal processor can perform a demodulation operation on the basis of the same transmit diversity method where the Node-Bs use the same transmit diversity method.

11. A method for demodulating signals transmitted from one or more Node-Bs using transmit diversity methods selected on a Node-B basis in a mobile communication system, comprising the steps of:
receiving transmit diversity information of the Node-Bs and selecting one transmit diversity method on the basis of the received transmit diversity information;
assigning multipath signals received from the one or more Node-Bs to a plurality of fingers on a path-by-path basis and discriminating among the multipath signals;
selectively combining signals output from the fingers according to transmit diversity methods used at the Node-Bs; and
demodulating the signals on the basis of the selected transmit diversity method.

12. The method as set forth in claim 11, wherein the transmit diversity method comprises one of an open-loop transmit diversity method and a closed-loop transmit diversity method.

13. The method as set forth in claim 12, wherein the open-loop transmit diversity method comprises one of a time-switched transmit diversity (TSTD) scheme and a space-time transmit diversity (STTD) scheme.

14. The method as set forth in claim 12, wherein the closed-loop transmit diversity method comprises one of a first closed-loop transmit diversity mode for performing a compensation operation by taking into account a phase difference between signals received from antennas of each Node-B and a second closed-loop transmit diversity mode for performing a compensation operation by taking into account the phase difference and a level difference between the signals received from the antennas of each Node-B.

15. The method as set forth in claim 11, wherein the combining step is performed by selecting and combining all signals output from fingers using transmit diversity and only first antenna components of signals output from other fingers without using the transmit diversity.

16. The method as set forth in claim 11, further comprising the step of:
allowing switches for switching an output of second antenna components to be turned on/off so that second antenna component signals from fingers can be selectively combined.

17. The method as set forth in claim 11, further comprising the step of:
performing a transmit diversity signal processing operation on the basis of a transmit diversity method of at least one neighboring Node-B where a serving Node-B performs a transmission operation without using transmit diversity.

18. The method as set forth in claim 11, further comprising the step of:
performing a control operation so that a demodulation operation for signals from at least one neighboring Node-B can be performed without using transmit diversity where a serving Node-B performs a transmission operation using predetermined transmit diversity and a transmit diversity method of the neighboring Node-B is different from that of the serving Node-B.

19. The method as set forth in claim 11, further comprising the step of:
performing a control operation so that a demodulation operation is performed on the basis of the same transmit diversity method where the Node-Bs use the same transmit diversity method.

* * * * *